INVENTORS
HANNO GOOS
HANS WOLFGANG MAURER
BY Dodge and Sons
ATTORNEYS

March 7, 1967  H. GOOS ETAL  3,308,037
MANUFACTURE OF STARCH DECOMPOSITION PRODUCTS
Filed Aug. 10, 1962  3 Sheets-Sheet 3
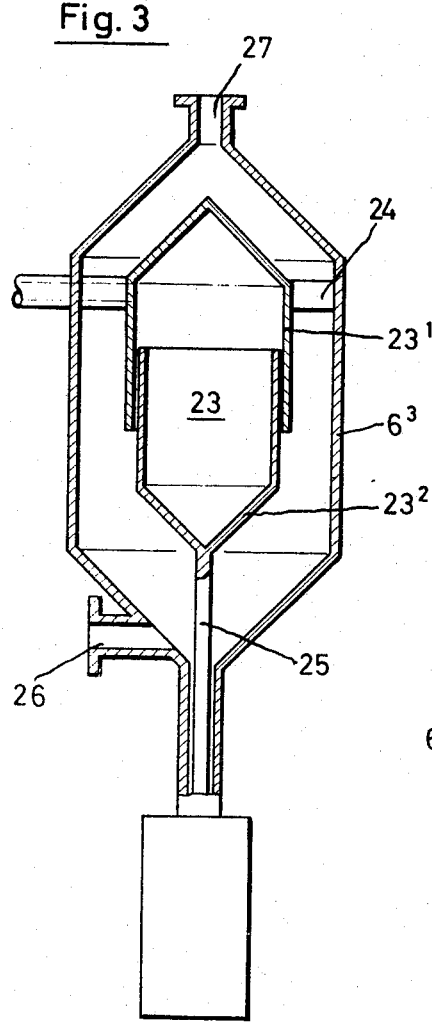
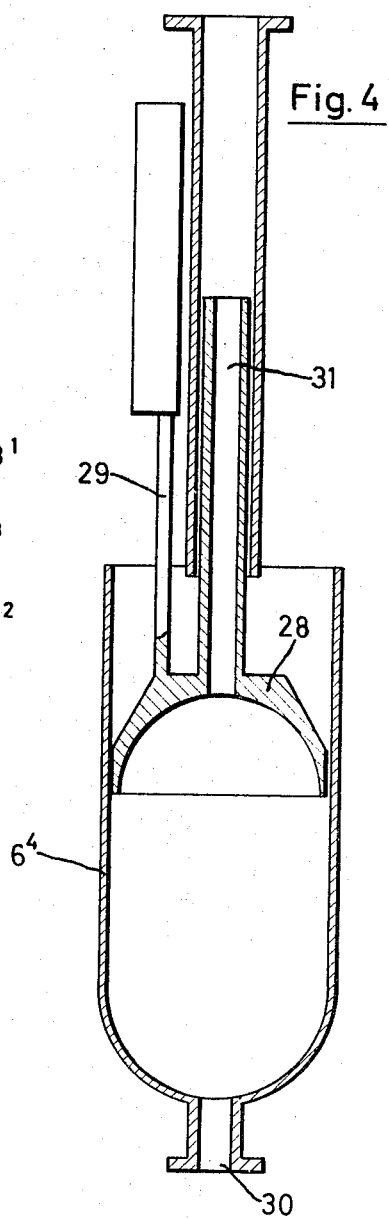
INVENTORS
HANNO GOOS
HANS WOLFGANG MAURER
BY
Dodge and Sons
ATTORNEYS United States Patent Office 3,308,037
Patented Mar. 7, 1967

3,308,037
MANUFACTURE OF STARCH DECOMPOSITION PRODUCTS
Hanno Goos and Hans Wolfgang Maurer, Ravensburg, Germany, assignors, by mesne assignments, to West Virginia Pulp and Paper Company, New York, N.Y., a corporation of Delaware
Filed Aug. 10, 1962, Ser. No. 216,105
Claims priority, application Germany, Oct. 21, 1961, E 21,843; July 5, 1962, E 23,149
14 Claims. (Cl. 195—31)

This invention relates to process and installation for the manufacture of starch decomposition products, preferably for the gelatinization and enzymatic hydrolysis of starch.

The starch employed in many branches of industry, for example the paper-making industry, the food industry and the fermentation industry for the production of starch decomposition products and starch derivatives, as well as for many other purposes as basic substance or accessory substance, must in many cases be completely or partly gelatinized before use. By the action of a temperature generally situated at 65° C. to 80° C. and depending on the kind of starch, the gelatinizing temperature, the starch grains are caused to swell and are finally destroyed. The amylopectin and amylose molecules which build up to starch grain can hydrate and form a thick paste. Since an untreated native starch generally combines with about ten times its weight of water, homogeneous starch pastes, capable of flowing under normal conditions, can be obtained only up to a maximum concentration of about 12%. If starch pastes of high concentration are to be produced, the starches must be decomposed before, during or after gelatinization by chemical, biological, mechanical, thermal or other processes to reduce the size of the molecules and to diminish hydratability. By means of enzymatic hydrolysis, for example, starch pastes can be made with a dried substance content of up to 60%.

The starch may be gelatinized and enzymatically decomposed in known manner in tanks by the batch process. Either a starch suspension, mixed with amylases is raised by heating directly or indirectly and with adequate stirring to a temperature situated above the gelatinizing temperature and advantageously for enzymatic hydrolysis between 65° C. and 100° C. and left at this temperature for a sufficient length of time, or a starch suspension mixed with amylases is poured into hot and heated water with stirring and is left at the optimum reaction temperature for a length of time sufficient for hydrolysis, or a starch mixed with enzyme is sprinkled into hot water and decomposed at the optimum temperature. The starch should be completely gelatinized before the commencement of enzymatic hydrolysis, since starch is accessible to hydrolytic decomposition only after the destruction of the orginial grain structure. During the swelling of the starch and the primary gelatinization, the viscosity increases temporarily very considerably to within a range of between 10,000 and 100,000 centipoises. To ensure homogeneous paste formation and uniform enzymatic decomposition of the starch, the use of powerful agitator mechanisms is necessary in the processes described.

For some technical fields of application, only dextrins should be formed from the starch during enzymatic hydrolysis, while maltose formation above 1% is undesirable. To ensure the desired performance of the reaction, α-amylase is generally used as starch hydrolysing enzyme. In addition, maltose formation may be limited if, before the actual hydrolysis, the starch suspension is heated as rapidly as possible to 80° C. The reaction velocity of the enzymatic starch decomposition can be increased by the adjustment of an optimum pH-value range, by the addition of alkali and alkaline earth ions and by avoiding the presence of toxically acting substances. After the desired viscosity of the dextrin solution has been reached, complete thermal or chemical inactivation of the added enzymes is necessary to prevent excessive starch decomposition.

The known discontinuous (batchwise) processes for the gelatinization and enzymatic hydrolysis of starch have in common the disadvantage of a necessary time requirement of 80 to 120 minutes, of which 30 to 90 minutes are necessary for the enzymatic starch decomposition, and the remainder for preparing the starch suspension and thermal inactivation. For carrying out the processes, large tank installations with powerful agitators are used. In view of the size of these installations, conscientious and scrupulous attention is necessary, but the desired uniformity of the pastes in regard to viscosity cannot be adequately ensured for all charges. The processing of starch by the batch process can only be inadequately adapted to sudden operational disturbances and changes. A further disadvantage is the long waiting time of batches made in large amounts before they are used, which presupposes careful enzyme inactivation, but this does not eliminate all the possible losses of yield and quality through secondary infection of the dextrin pastes, which are exposed extraordinarily to the danger of decay. For the numerous, already briefly mentioned processes in which gelatinized and hydrolysed starch is used, a method of rational continuous gelatinization and continuous hydrolysis is thus of exceptional interest.

The process according to the present invention obviates the above-mentioned disadvantages. The invention consists in that, in a continuous process, the chemical and/or biological active substance are added to the starch suspension to be processed, and the mixture is continuously passed through a reaction zone with temporary acceleration of the flow followed by direct mixing with steam, the added active substance, during the steam passage and directly after the continuous gelatinization, becoming active in a field of action of high enforced stressing by impacting and/or shearing forces.

In the application of this process, it has been unexpectedly found that the usual and natural very high peak viscosities of the starch pastes, before the onset of the viscosity-reducing enzymatic hydrolysis, are not developed, but that on the contrary appreciable fluidification of the starch sets in. In this way, it is possible to gelatinize and enzymatically decompose starch in the concentration region of 40% in a very short time. The reaction velocity is naturally determined by the amount of enzyme employed. It has been found, however, that the necessary enzyme concentrations for the described continuous process do not exceed a technically usual and economic range of about 0–0.5%, depending on the quality of the enzyme. High reaction temperatures promote the velocity of starch decomposition, but here a natural limit is set by the temperature sensitivity of the enzymes. In the preparation of the starch suspensions for the continuous gelatinization and continuous enzymatic hydrolysis, an addition of chemicals is sometimes advantageous for adjusting an optimum pH-value, for stabilizing the enzymes, for binding heavy metals, for increasing the reaction velocity and so forth.

The said reaction zone may, for example, be an apparatus such as forms the subject of copending application Serial No. 212,898, filed July 27, 1962, now Patent No. 3,219,483, and in which one or more nozzles or diaphragms are provided for effecting the transient or temporary acceleration of flow of the mixture passing through. The steam is injected behind these cross-section constrictions, the transport tube continuing with its original cross-section, or the cross-section constriction may be followed by a conical widening, machined smooth or provided with regular unevennesses up to the original tube diameter, said conical widening being provided with orifices for the supply of steam. The starch suspension and starch paste move gradually through the reaction zone solely due to a pressure gradient; mechanical aids, such as for example conveyor worms, are not necessary. In the temporary acceleration of flow and in the mixing of the starch milk with steam, hydrodynamic forces are exerted on the forming or already present starch paste, such that gelatinization and enzymatic decomposition are advantageously promoted.

The continuously produced starch paste may be passed, preferably during the enzymatic hydrolysis, through an additional field of action of high imposed stresses by impacting and shearing forces. This may be accomplished, for example, by temporarily subdividing the material flow of the starch paste by means of diaphragms or the like into a series of partial streams. Due to this subdivision into partial streams, viscosity-reducing shearing forces are exerted on the starch paste; in addition there is intensive mixing of the heated mixture of starch, water and enzyme.

After leaving the said reaction vessel, the dextrin paste may be passed through a high-speed machine consisting of stators and rotors, such as is usually employed for the disintegration and speck-removal of celluloses. In passing through this field of action of mechanical impacting and shearing forces, the structure viscosity of the dextrin paste is extensively destroyed, so that the fluidity is still further increased and accessibility of the enzymes to the primary starch decomposition products is considerably improved. The primary product formed in the reaction vessel may also be subjected, for accelerating the enzymatic hydrolysis, both to impacting and shearing stresses in a disperser, as well as exclusively to shearing stresses combined with a mixing action in a reaction tube provided with diaphragms, screens, nozzles and the like, the employment and combination of these devices being determined by the desired end quality of the continuously produced dextrin.

As already mentioned, chemical and mechanical processes, besides biological processes, may be used for the continuous starch decomposition. Of the group of chemical decomposition processes, of particular interest are those which, by a limited hydrolytic decomposition, merely result in starch modifications with improved rheological properties, or those in which, in addition to this limited decomposition, reactions occur on the starch molecule by oxidation, reduction, substitution, addition or ion exchange, so as to form starch derivatives. In the same way as is described in detail for the enzymatic decomposition, a starch suspension may be mixed continuously with suitable inorganic or organic chemicals, and this mixture may be passed through a reaction tube with temporary acceleration of the flow, followed by direct mixing with steam. The added chemicals are effective during and after the spontaneous gelatinization of the starch, and modify the chemical and physical properties of the starch paste in the direction provided. The gelatinization zone is advantageously followed by a reaction zone of the kind already described, in which starch decomposition or derivative production is carried out to the desired extent in a field of action of mechanical impacting and shearing stresses, together with intensive homogenization of the paste. The processes for the mechanical starch decomposition may also employ the action of high mechanical frequencies, for example ultrasonic vibrations, and also the radiation field of a radioactive isotope. They result in a reduction in the viscosity of the starch pastes as well as in modified chemical and physical properties.

For the manufacture of a large number of technical starch products, the dextrin produced by enzymatic hydrolysis and having definite flow properties must then be mixed with pigments or other additives. A coating mass intended for the surface improvement of paper consists as an example of a technical starch product, substantially of a binder and pigments, as well as various auxiliary agents, the purpose of which is to increase the degree of dispersion of the pigments, improve the fluidity of the coating composition, economise in binder, and so forth. The prerequisites for the choice of a suitable binder for paper coating compositions are that the binder can be made in high concentration, the quantities of water which have to be evaporated after the improvement of the paper are acceptable from the point of view of cost, the viscosity of the paper coating composition permits continuous improvement of the paper by a sizing press directly in the paper-making machine and at high velocities, and so forth. These requirements can be met in an outstanding manner by using decomposed starch. Starch improvement is generally carried out in the starch works. In the last few years as a specialty, enzymatic starch decomposition has been developed as a working process in the paper-making works.

Currently, it is the rule to use paper-coating compositions in batches, and consequently the starch is also gelatinized in batches. Discontinuous and separate preparation of binders and pigments as well as the other constituents of a paper-coating composition is affected by a number of economic drawbacks, including the already described disadvantages of the discontinuous production of the starch component. As additional drawbacks may be mentioned: deficient adaptability of the process to short-time changes in the paper improvement, difficult correction of wrong charges, difficulty in influencing the coating behaviour of ready-made paper coating compositions, the additional requirements for attendants for the necessary mixing plants and so forth. Good agitators and long stirring times are necessary for mixing binders and pigments. It is obvious that one-time and possibly continuous production of the entire paper-coating composition as suspension followed by gelatinization of the binder results in definite economic advantages.

For simplifying the production of coating composition, a process for the discontinuous gelatinization of starch in the presence of the pigments and other constitutents of paper-coating compositions and of amylases has already been developed and put into practice. Continuous production processes are of increasing interest on the lines of modern technical development. The suitability of the process described in the foregoing for the continuous gelatinization and continuous enzymatic hydrolysis of starch as suspension in water, also with regard to suspensions containing starch merely as constituent, is therefore obvious.

The above-described fluidizing effect of anzyme on starch paste during passage through a reaction section, preferably a tube with one or more cross-section constrictions, through which the prepared total suspension is passed, and in the walls of which, after the cross-section constrictions in the transition region to the full tube cross-section one or more inlet orifices for steam are provided, also occurs in the processing of suspensions which contain starch only as constituent. The primary gelatinizing device is advantageously followed by mechanical fluidizing aids, such as screens, diaphragms, nozzles and so forth. The proportion of water necessary in the method of working hitherto for suspending the pigment and auxiliary substances participates in the hydration of the starch and reduces the excess of water, which constitutes a special problem in the production and hydrolysis of concentrated starch pastes. For carrying out starch decomposition in the presence of water-soluble and water-insoluble substances in a continuous process in the time required, the exposure of the treated substance to stress by hydrodynamic forces, such as is effected by cross-section constrictions, is if necessary amplified additionally by a further field of action of high imposed stressing by impacting and shearing forces. A high-speed machine, consisting of stators and rotors, such as is normally used for the disintegration and speck-removal of cellulose, is suitable for example for this purpose. Due to the positive action of this field of action of mechanical forces, the residues of structural viscosity are destroyed, so that the fluidity of the paste is increased and the accessibility of the enzymes to the amylopectin and amylose molecules is improved.

The enzymatic starch decomposition makes a certain length of stay in the plant necessary. Should it be found in special cases that the desired degree of decomposition cannot be attained in the time provided, it is advantageously possible to increase the reaction time by returning the dextrin pastes to a reaction zone through which they have already passed. Thus, for example, part of the already prepared but still excessively viscous paste can be returned and mixed with the paste entering the reaction zone.

It is characteristic of all processes for the enzymatic hydrolysis of starch that after the desired degree of decomposition of the starch pastes, the enzymes must be inactivated by thermal or chemical action, in order to terminate the decomposition. For this purpose, the continuously produced starch hydrolysate or the continuously produced paste of starch decomposition product is mixed continuously with steam or a chemical solution with repeated temporary acceleration of flow. Devices may thereby be used of the same kind as those used for the gelatinization and hydrolysis of the starch. Through the orifices in the tube or cone wall following the cross-section constriction, additional steam or a chemical solution, for example zinc sulphate solution, copper sulphate solution or dilute sulphuric acid is forced in and intimately mixed with the paste.

In the same way, in the numerous processes of chemical starch decomposition, it is necessary to interrupt the reaction of the added active substance after the desired degree of decomposition is reached. For this purpose, neutralizing agents, oxidizing agents, reducing agents or any other additions are fed into the flowing paste and intimately mixed with the latter.

Furthermore, water may also be added to the starch paste for dilution and/or temperature adjustment with temporary acceleration of flow. For this purpose, it is possible to use devices of the same kind as are used for the gelatinization and enzymatic hydrolysis of the starch and for returning the starch pastes. In the same way, the addition of preserving agents or temperature-sensitive substances of a technical starch product, following direct or indirect cooling is possible.

A further advantage of the continuous production of decomposed starch pastes and technical starch products, such as for example, paper-coating compositions, is the possibility of controlling the viscosity and coating behaviour. If it is possible to utilize a relatively short control distance between measuring point and controlled quantity, it is possible to produce in the continuous process a starch product with definite flow properties. As control quantities, it is possible to use the proportions of water, starch or pigment, the gelatinizing temperature and the length of stay in the plant, and in the continuous enzymatic hydrolysis of starch, also the proportion of enzyme.

In the gelatinization of starch in the presence of pigments and other water-insoluble constituents of the total suspension, some coagulation of the pigment to larger particles is possible. For dispersing these agglomerates, for further homogenising a coating composition, and for continuing the decomposition of the starch, it is also possible to employ successfully a field of action of high imposed stresses by impacting and shearing forces. During the imposed action by the mechanical field of action, pigment agglomerates are separated, lumps of paste broken down and residues of structure viscosity dispersed. The continuously produced paper-coating composition may be passed through a disperser of the kind described.

In the same way as a mixture of starch and enzyme, it is of course also possible to pass a starch, previously decomposed in a separate process and mixed with other water-insoluble or water-soluble substances, through the gelatinization and reaction zone.

EXAMPLE 1

A 15% starch suspension referred to the absolutely dry substance is made by mixing air-dried maize starch with tap-water. This suspension without enzyme addition is passed continuously through the gelatinizing apparatus, being heated at the same time to 95° C.. The discharged paste has a viscosity (Brookfield) of 20,000 to 30,000 centipoises. In a second experiment, the starch suspension was mixed with 0.2% of a technically pure α-amylase, referred to the air-dried starch charge, and passed through the gelatinizing apparatus in the same conditions, no mechanical fluidizing aids being used. The discharged, uncoloured starch paste had a viscosity (Brookfield) of 50 to 55 centipoises.

EXAMPLE 2

A 25% starch suspension (referred to the absolutely dry substance) was made by mixing air-dried maize starch with tap-water. This suspension was mixed with 0.2% of commercially pure α-amylase, referred to the air-dried starch charge, and passed continuously through the described gelatinizing apparatus, being heated at the same time to 95° C. The gelatinizing apparatus was followed by 2 screens as mechanical fluidizing aids. The discharged uncoloured starch paste had a viscosity (Brookfield) of 160 to 200 centipoises.

A further development of the process according to this invention, more especially for the production of d-glucose or dextrin, consists in that after admixing the active substances with the starch suspension to be processed and after conduction through the reaction zone with temporary acceleration of flow and subsequent mixing with steam, the primarily liquefied starch paste thus obtained is continuously conducted through at least one additional reaction zone for the purpose of continuing the degradation reaction and adjusting desired chemical and physical properties, the free cross-sectional area of said additional reaction zone being larger than that of the pipe conduits before and after the first-mentioned reaction vessel.

The invention is also concerned with an installation for carrying this process into effect.

Embodiments of such an installation are illustrated in simplified form and by way of example in the accompanying drawing. The process is also explained by way of example and by reference to these embodments. In the drawing:

FIGS. 3 and 4 show the additional reaction vessels for continuing the degradation reaction, on a larger scale.

Figure 1:
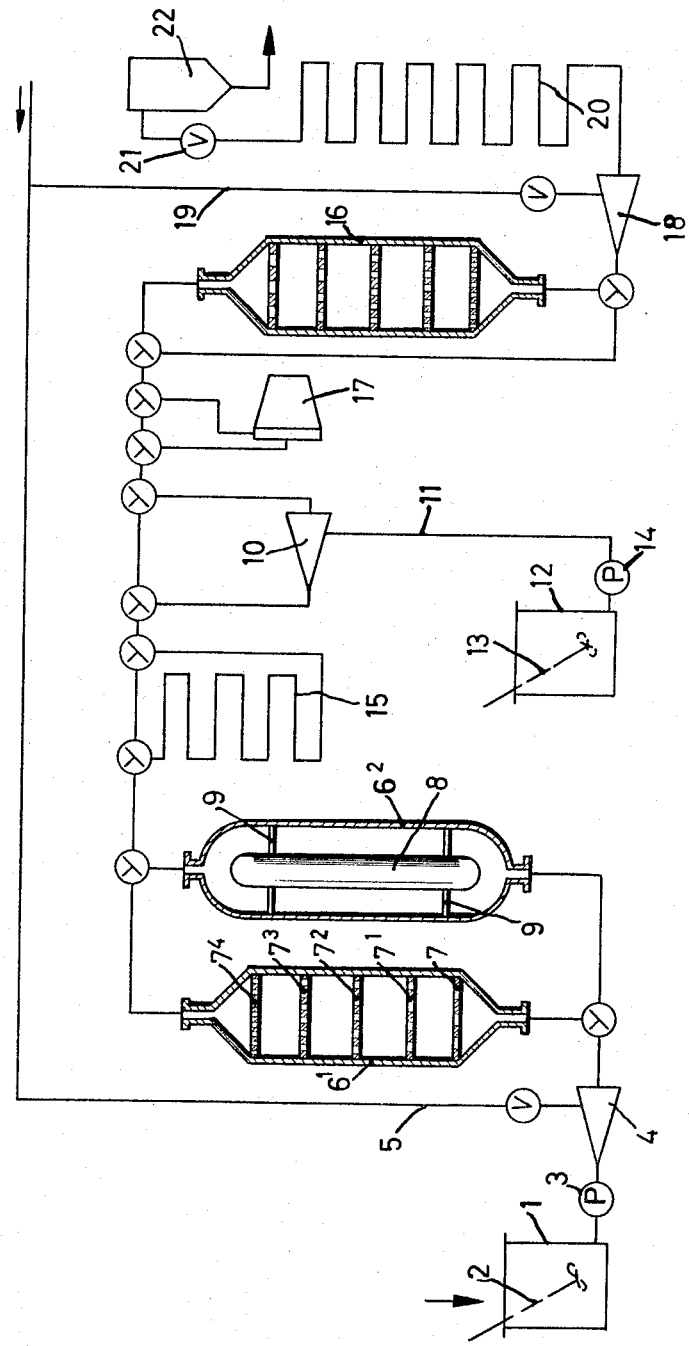
FIG. 1 shows an installation for the production of d-glucose.

According to FIG. 1, the starch suspension is prepared in a tank 1 with a stirrer mechanism 2, mixed with enzyme, and then conveyed by means of a proportioning pump 3 through the installation. The gelatinization and primary liquefaction of the starch takes place in a reaction vessel 4. The mixture is then conducted through the reaction vessel 4 with a temporary acceleration in flow and subsequent mixing with steam entering through a pipe 5, the previously added active substances (enzymes) becoming operative during the steam passage and immediately after the continuous starch gelatinization in an effective field of high imposed stress due to impacting and/or shearing forces. The reaction vessel 4 can for example be an arrangement such as forms the subject of copending patent application Serial No. 212,898, filed July 27, 1962, and which consists of a tube having one or more constrictions in cross-section, through which the starch suspension is conducted, and in the wall of which, after the cross-sectional constriction and in the transition range to the full tube cross-section, one or more inlet orifices are provided for the steam.

From the reaction vessel 4, the primarily liquefied starch paste contained therein passes selectively into one of two additional and mainly cylindrical reaction vessels $6^1$, $6^2$ for the purpose of continuing the degradation reaction and adjusting required properties, the said paste flowing longitudinally through said vessel, the free cross-sectional area of which is larger than that of the pipe conduits before and after the first reaction vessel 4.

The vessel $6^1$ contains screens or sieves 7, $7^1$, $7^2$, $7^3$, $7^4$, which extend at a certain distance from one another over the entire cross-section of the vessel and serve for producing a uniform flow and also for producing a mixing effect. The free cross-sectional area of the individual apertures in the screens preferably decreases from the inlet end towards the outlet end of the vessel, so that consequently the screen $7^4$ of the vessel $6^1$ has smaller apertures than the screen 7.

The vessel $6^2$ contains a displacement member 8 of cylindrical form with semi-spherical ends, the said member being arranged co-axially of the vessel $6^2$ and being held by webs 9. There is thus produced an annular cross-section for the free passage of the starch paste. The displacement member 8 also serves to steady the flow. By suitable choice of the diameter and length of the displacement member 8, it is however also possible for the effective volume of the vessel $6^2$ and thus the residence time of the starch paste in this vessel to be modified.

In the event that a subsequent saccharification with a temperature-sensitive enzyme is to follow a primary liquefaction, for example by a thermophilic carbohydrase, a reaction vessel 10 of substantially the same type as the reaction vessel 4 is connected on the output side, into which the intermediate product obtained at the outlet of the vessel $6^1$, or the vessel $6^2$, is introduced. Instead of steam, this additional active substance is fed as a solution or suspension in water through a pipe 11 into the reaction vessel 10. The reference 12 designates a tank for the preparation of this solution or suspension, while 13 is a stirrer mechanism and 14 is a pump for conveying the solution or suspension into the pipe 11. One or more additional active substances can also be introduced in the same way as the second active susbtance is supplied.

In order that the temperature permissible with this second active substance may not be exceeded in the starch product, a cooler 15 is also provided in the installation, through which cooler the starch product can if necessary be conducted before it is introduced into the reaction vessel 10. In certain circumstances, however, it is also sufficient for the additional active substance to be fed in with a corresponding quantity of solution or suspension water for the purpose of cooling the flowing starch product.

Connected after reaction vessel 10 is an additional vessel 16 of the same type as the reaction vessel $6^1$ or $6^2$, and serves for the continuation of the degradation reaction. It is however possible for the flowing product, after feeding in the additional active substance, to be also subjected in an apparatus 17 to impacting and shearing effects of high frequency for the purpose of thoroughly mixing the components in the form of a film with a single or multiple deflection and acceleration. The device involved here can with advantage be an arrangement comprising a highspeed rotor formed with toothed rims and a corresponding stator.

Finally, for completing the enzyme action, the product obtained is conducted through a device 18 which is similar in construction to the reaction vessel 4 serving for the gelatinization. This device 18 serves for the thermal inactivation of the active substances. For the purpose of setting a temperature which is advantageously higher than 110° C., the product is mixed in this device with steam under superatmospheric pressure, the said steam being supplied to the device 18 through a pipe 19. Following the device 18 is a pipe conduit 20, in which the heated product is further exposed for some time to the high temperature for the purpose of complete inactivation of the active substances. Thereafter, the product is discharged through a throttle member 21 and an expansion chamber 22. In the same way as the thermal enzyme inactivation, it is also possible by means of the device 18 to carry out a chemical enzyme inactivation by feeding in a substance which acts as a poison to the enzyme.

The following examples are intended for further explaining the process.

EXAMPLE 3

By mixing 100 kg. of maize starch of normal commercial humidity with 200 litres of tap water, a 30% starch suspension is produced in the tank 1. 0.2% of an α-amylase of industrial purity, based on the air-dry starch charge, is added thereto and the pH value is adjusted to a value favourable for the enzymatic conversion. The amylase is stabilised by adding calcium phosphate or phytate. The starch suspension prepared in this way for the conversion is continuously conveyed through the reaction vessel 4 and is heated to 90° C. by mixing with steam. The gelatinization and primary starch liquefaction produces a product with a viscosity of 350 cp. The starch product is conducted through the additional vessel $6^1$ or $6^2$ having a capacity of about 100 litres and serving for continuing the degradation reaction and remains therein for 5 to 20 minutes, depending on the required degree of degradation of the starch. The counter-pressure built up by the reaction vessel and the necessary bend in the pipe conduit does not exceed 1 atm. gauge in this case. The sugar solution thereafter passes through the device 18, which serves for inactivating the enzyme, and is heated to at least 110° C. by feeding in steam at a pressure of 1 to 2 atm. gauge. The sugar solution remains for 30 seconds to 2 minutes in the subsequent pipe section 20 for complete enzyme inactivation. A sugar solution is formed which contains mainly limit dextrins and maltose and which can be processed to starch syrup by decolorisation, elimination of substances causing turbidity and concentration by evaporation.

EXAMPLE 4

By mixing 100 kg. of maize starch of normal commercial moisture with 120 liters of water, a 40% starch suspension is prepared in the tank 1 and 0.3 to 0.5% of α-amylase of industrial purity, based on the air-dry starch batch, is added thereto and the suspension is adjusted to the optimum reaction conditions by adding chemicals. The product is continuously conveyed through the reaction vessel 4 and, by feeding in steam at a pressure of 5 to 10 atm. gauge is heated to 95° C., gelatinized and primarily liquefied. For continuing the degradation reaction, the starch solution is pumped through one of the reaction vessels $6^1$, $6^2$, and after reaching a controlled degree of degradation, passes through the reaction vessel 10, which is of similar construction to the reaction vessel 4. The intermediate product is diluted in vessel 10 to 30 to 35% solid content by feeding in a solution or dispersion of β-amylase or α-glucodiase in cold water from the tank 12, is cooled to 60 to 70° C. and mixed with this second specifically active enzyme. The product is thereafter advantageously conveyed into the device 17 for intensively mixing the enzyme with the primarily produced dextrin solution and subsequently conducted into the vessel 16 for continuing the degradation reaction. Finally, it passes through the device 18, the inactivation zone 20 and the expansion chamber 22. The sugar solution thus obtained is purified, concentrated and either worked up to a syrup with a high maltose or glucose content or transferred into an arrangement (not shown) for the crystallisation of the dissolved sugar.

EXAMPLE 5

The production of d-glucose is effected substantially by the same process as that indicated in Example 4. Before admixing a temperature-sensitive enzyme, however, the product initially liquefied by thermophilic α-amylase is cooled in the cooler 15 to such a degree that the addition of the carbohydrase intended for the subsequent saccharification can be effected with a small quantity of water sufficient for the complete mixing and the final saccharification can be carried out in a temperature range from 40 to 60° C.

Figure 2:
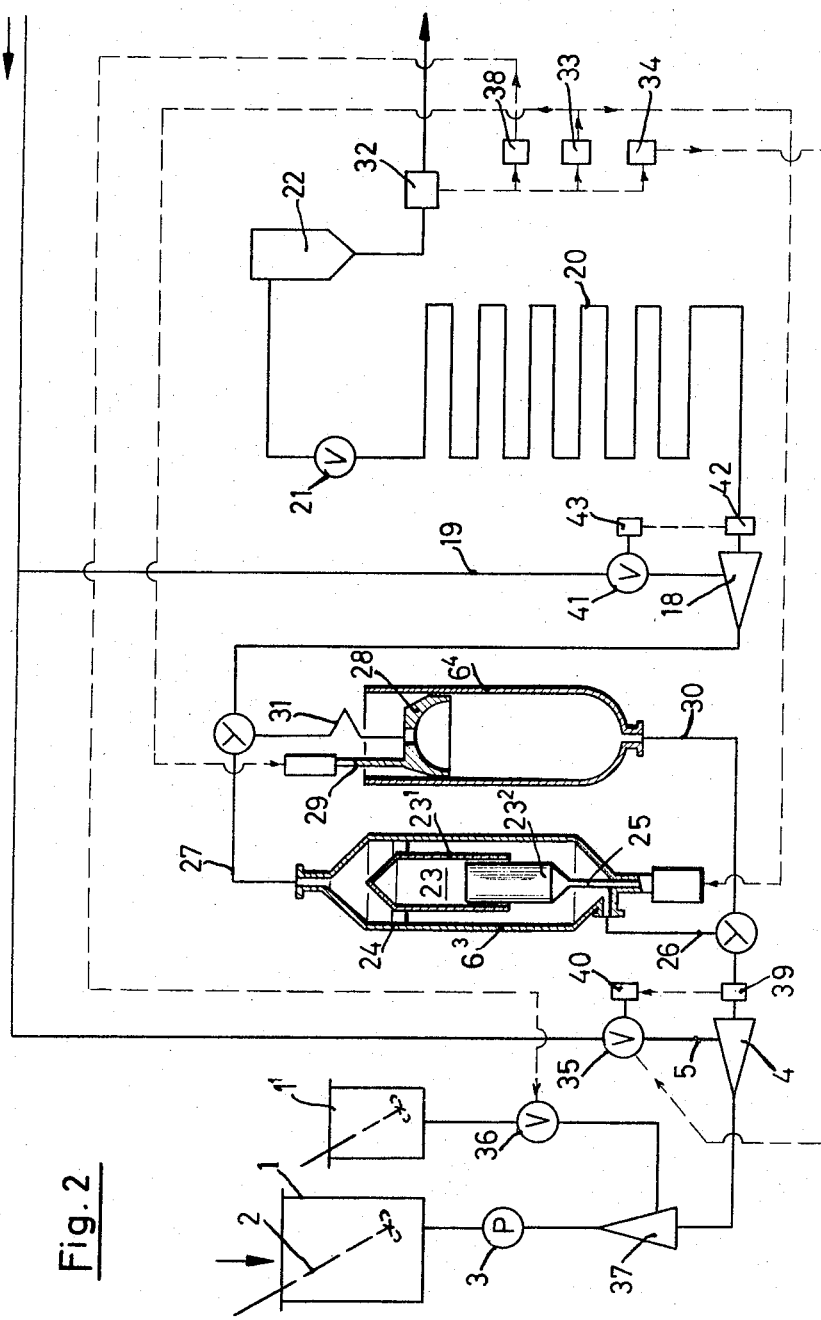
FIG. 2 shows an installation for the production of dextrin.

The installation according to FIG. 2 is intended for the production of dextrin. It comprises in part the same devices and apparatus as the arrangement shown in FIG. 1, and consequently these are provided with the same reference numerals.

The starch suspension prepared in the tank 1 and mixed with amylase is again conveyed by means of the proportioning pump 3 into the reaction vessel 4, in which the gelatinization and primary liquefaction of the starch is effected by mixing with steam supplied from the pipe 5. In this case, instead of the vessels $6^1$, $6^2$ for continuing the degradation reaction, mainly cylindrical vessels $6^3$, $6^4$ constructed in a particular manner are provided, these vessels being traversed longitudinally by the primarily liquefied starch paste originating from the reaction vessel 4, the free cross-sectional area of said vessels being larger than that of the pipe conduits before and after the reaction vessel 4. The degradation reaction is terminated by the product being conducted through the inactivation device 18, to which steam is supplied from the pipe 19, and through the pipe conduit 20 serving as inactivation zone. The product thereafter flows through the throttle member 21 and through the expansion chamber 22.

The vessels $6^3$, $6^4$ serving for the continuation of the degradation reaction are so designed that their effective volume can be varied. Corresponding to FIG. 3, the vessel $6^3$ contains a displacement member 23 which is arranged co-axially thereof and which consists of two sleeves $23^1$ and $23^2$ closed at one end, the said sleeves engaging telescopically one within the other at their open ends while sealing off their internal space from the free space of the vessel $6^3$. The sleeve $23^1$ is secured by means of tubes 24 to the wall of the vessel $6^3$. On the other hand, the sleeve $23^2$ is freely movable axially and is guided by a rod 25 extending through the bottom of the vessel $6^3$. It is thus possible for the volume of the displacement member 23 to be varied.

The primarily liquefied starch paste coming from the reaction vessel 4 passes through a pipe 26 into the vessel $6^3$ and leaves the latter through a pipe 27. The effective volume of the vessel $6^3$ can now be varied by altering the volume of the displacement member 23 for the purpose of adjusting the residence time of the starch paste in the vessel $6^3$. For this purpose, either the rod 25 is moved from outside in its axial direction, or a gaseous or liquid medium is introduced into or released from the interior of the displacement member 23 through one of the tubes 24. With this method of procedure, it is also possible to use an elastically deformable container as displacement member instead of a displacement member consisting of components displaceable one within the other.

According to FIG. 4, the vessel $6^4$ is constructed as a tube with a semi-spherical base. The possibility of changing the effective volume of the vessel $6^4$ is achieved by a piston-like construction of the upper closure member 28. The piston 28 has a semi-spherical recess on the side facing the liquid for improving the guiding of the liquid. However, it could for example also be constructed as a hollow cone for this purpose. The piston 28 can be displaced axially by a rod 29. The initially liquefied starch paste enters through a pipe 30 opening into the vessel $6^4$ at the bottom and leaves the vessel $6^4$ through a flexible pipe 31 connected in the middle of the piston 28.

According to FIG. 2, the installation also comprises various regulating means. One of these regulating means contains a viscometer 32 as measuring element, which can be operated by the rotation principle or which is advantageously formed as a diaphragm traversed at constant velocity by the expanded and deaerated end product. The regulating impulse, which in the second case is the difference of the operative pressures of the said diaphragm, then travels by way of a transmitter 33 either to the rod 25 of the displacement member 23 in the vessel $6^3$ or to the rod 29 of the piston 28 in the vessel $6^4$. By suitable adjustment of the effective volumetric capacity of these vessels and thus the reaction period, the progress of the reaction is so controlled by the regulating means 32, 33, 25, 23 or 32, 33, 29, 28 that the viscosity of the end product assumes a prescribed value. The regulating impulse from the viscometer 32 could however also be conveyed by a path not illustrated in the drawing by way of the transmitter 33 and a gas or liquid supply to the tube 24 in the reaction vessel $6^3$. By gas or liquid at suitable pressures being injected into or discharged from the displacement member 23, the effective size thereof and thus the reaction time of the starch product would be modified.

Alternatively, the regulating impulse of the viscometer 32 can moreover also be conducted through a transmitter 34 to a valve 35 fitted in the steam pipe 5, in order to alter the reaction temperature adjusted by supply of steam in the reaction vessel 4 for the purpose of correcting the viscosity of the end product. Finally, a tank $1^1$ is also provided, from which the enzyme solution or suspension necessary for the degradation reaction can be completely admixed, or a necessary additive can be admixed, by way of a regulative valve 36 or a proportioning pump, with the starch suspension to be treated and in a mixing arrangement 37 of substantially the same type as the reaction vessel 10 in FIG. 1. The regulating valve 36 can likewise be adjusted through a transmitter 38 under the influence of the viscometer 32. It is therefore possible in this case for the addition of active substance to be correspondingly influenced for regulating the properites of the end product.

In addition, a regulating circuit is also provided for influencing the regulating valve 35 by a thermometer 39 connected after the reaction vessel 4 and measuring the reaction temperature through a transmitter 40, and also a regulating circuit for influencing a regulating valve 41 connected into the steam pipe 19 by a thermometer 42 measuring the inactivation temperature through a transmitter 43.

Instead of the viscometer 32, it is also possible to install in the regulating means a measuring instrument for another physical or even a chemical property of the end product. In particular, a regulating means of the type described can also be used in the production of d-glucose, for example in the installation according to FIG. 1. The vessel $6^1$ or $6^2$ serving for the continuation of the degradation reaction would then have to be replaced by a vessel of the type having a variable effective volumetric capacity, for example of the type such as $6^3$ or $6^4$ in FIG. 2. Instead of an instrument measuring the viscosity, it would then be possible to use, as impulse emitter, an instrument for determining the degree of saccharification, for example a colorimeter, a turbidometer or the like. The impulse being sent from the measuring instrument could then be utilised, after suitable amplification, for varying the effective volumetric capacity of the reaction vessels, for varying the enzyme proportioning or for varying the reaction temperature.

What is claimed is:

1. A process for the manufacture of starch decomposition products comprising continuously adding a chemically active starch modification substance to an aqueous suspension of starch; forming a continuous stream of the so-obtained mixture; passing said stream through a zone and enforcing temporary flow acceleraiton in said zone and then passing said stream through a second zone and enforcing deceleration of said stream in said second zone, the added starch modification substance being thus permitted to become active in a region where the stream is under high imposed stress, which exists in the region immediately following said temporary flow acceleration; admixing steam with said mixture during deceleration; repeating flow acceleration of the so-obtained product; and immediately after said repeated flow acceleration admixing with said product a reagent causing the starch modification to be broken off.

2. The process defined in claim 1 in which a portion of the continuously produced products is returned to the stream in advance of its temporary flow acceleration.

3. The process defined in claim 1 and cooling said stream after its deceleration; and adding temperature sensitive enzyme to the cooled stream.

4. The process defined in claim 1 and varying the temperature of the stream after deceleration thereof to maintain the desired viscosity of the obtained starch decomposition products.

5. The process defined in claim 1 and varying the time required for the stream to pass from the point of commencement of temporary flow acceleration to the point where reaction is broken off and thus maintain the desired viscosity of the obtained starch decomposition products.

6. The process defined in claim 1 and varying the amount of active starch modification substance added to maintain the desired viscosity of the obtained starch decomposition products.

7. The process defined in claim 1 in which after admixing the steam with the mixture of the starch suspension and the active starch modification substance, the flowing stream is further decelerated, then keeping the mixture of a time interval at the so-obtained low flow velocity while allowing the starch modification to continue, and then reaccelerating it before the starch modification is broken off.

8. A process for the manufacture of starch decomposition products comprising continuously adding a chemically active starch modification substance to an aqueous suspension of starch; forming the thus obtained mixture into a flowing stream; continuously passing the flowing stream through a reaction zone; causing a temporary increase of the flow velocity of the stream in said reaction zone; thereafter mixing steam with said flowing stream, the added starch modification substance being thus permitted to become active in a region where the stream is under high imposed stress, which exists in the region immediately folowing said temporary velocity increase, to produce a primarily liquefied starch paste; and conducting the primarily liquefied starch paste thus obtained through at least one additional reaction zone for the purpose of continuing the starch modification and obtaining the desired properties of the end product, the free cross-sectional area of said additional zone being larger than that of the flowing stream before and after the first named zone.

9. The process defined in claim 8 in which, saccharification is brought about by adding a temperature sensitive enzyme to the continuously flowing stream after passage of the stream through the additional reaction zone.

10. The process defined in claim 9 in which the enzyme is carbohydrase.

11. The process defined in claim 9 in which the flowing stream of starch product is cooled before the temperature sensitive enzyme is introduced.

12. The process defined in claim 9 in which the temperature sensitive enzyme is fed in with water for the purpose of cooling the flowing stream of starch product.

13. The process defined in claim 9 in which the temperature sensitive enzyme is fed in after passage of the flowing stream of starch product through said additional reaction zone and then passing the product through a second additional reaction zone serving for the continuation of the starch modification action.

14. The process defined in claim 8 in which the starch modification by the added active starch modification substance is terminated by adding steam at a temperature above 110° C. and under superatmospheric pressure and thereafter passing the flowing stream through a further reaction zone and then relieving the pressure.

References Cited by the Examiner
UNITED STATES PATENTS

| | | | |
|---|---|---|---|
| 1,212,656 | 1/1917 | Magne | 195—141 |
| 2,148,016 | 2/1939 | Gale | 195—17 |
| 2,302,310 | 11/1942 | Glarum | 195—17 X |
| 2,372,666 | 4/1945 | Fenn | 106—210 |
| 2,609,326 | 9/1952 | Pigman et al. | 106—210 |
| 2,717,213 | 9/1955 | Stevens | 195—31 |
| 2,724,679 | 11/1955 | Tsuchiya et al. | 195—31 |
| 2,735,792 | 2/1956 | Kroyer | 127—36 X |
| 2,738,305 | 3/1956 | Lohmar et al. | 195—17 |
| 2,818,357 | 12/1957 | Ziegler et al. | 127—36 |
| 2,822,319 | 2/1958 | Monod | 195—115 |
| 2,967,804 | 1/1961 | Kerr | 195—11 |
| 3,015,612 | 1/1962 | Pirt et al. | 195—141 |
| 3,039,935 | 6/1962 | Rentshler et al. | 195—31 |
| 3,039,936 | 6/1962 | Lenney et al. | 195—31 |
| 3,137,592 | 6/1964 | Protzman et al. | 127—71 |

A. LOUIS MONACELL, *Primary Examiner.*

ABRAHAM H. WINKELSTEIN, A. E. TANENHOLTZ,
*Assistant Examiners.*